Oct. 7, 1958     H. C. MORTON     2,855,081
CLUTCH FACING
Filed March 28, 1957
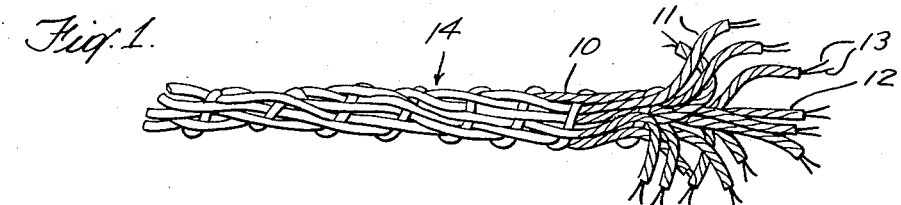
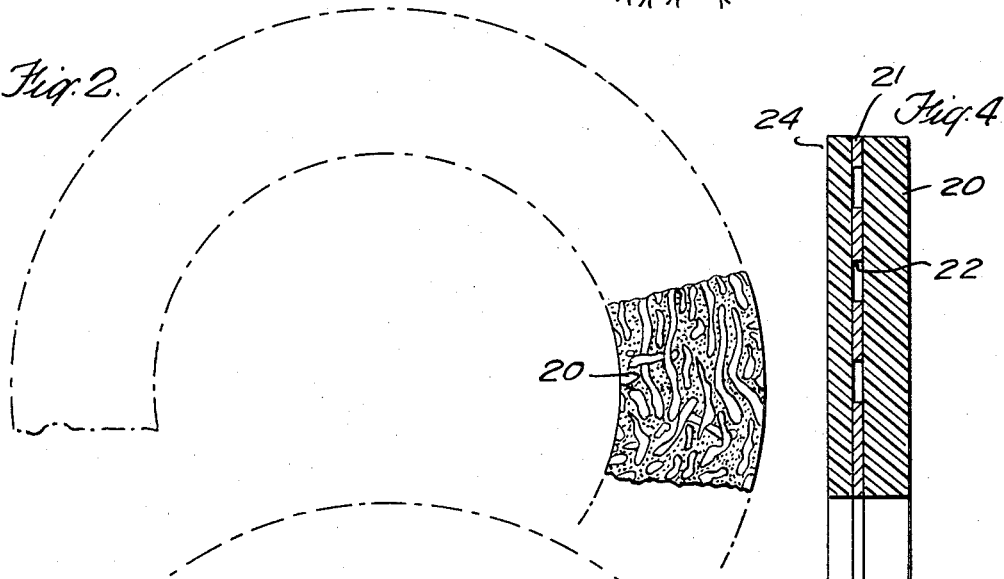
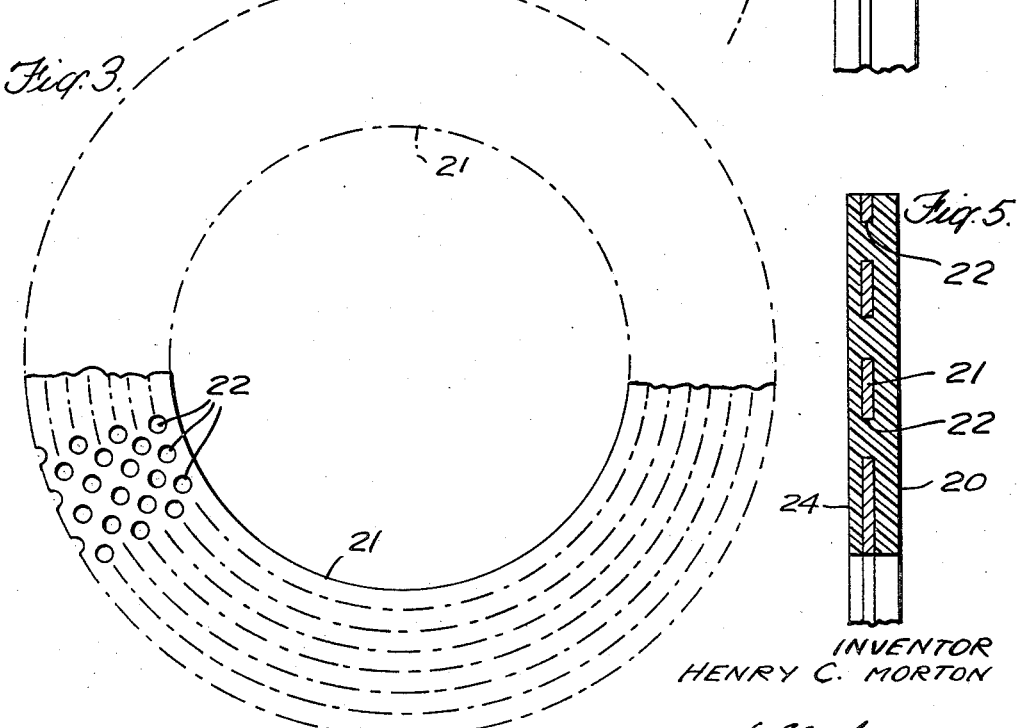
INVENTOR
HENRY C. MORTON
BY
ATTORNEY

United States Patent Office 2,855,081
Patented Oct. 7, 1958

2,855,081

CLUTCH FACING

Henry C. Morton, Branford, Conn., assignor to The Russell Manufacturing Company, Middletown, Conn., a corporation of Connecticut Application March 28, 1957, Serial No. 649,229

1 Claim. (Cl. 192—107)

This invention relates to clutch facings and has for an object to provide a clutch facing having novel and improved characteristics.

Another object is to provide a clutch facing having improved resistance to bursting at high speeds due to centrifugal force.

Other objects and advantages will be apparent as the nature of the invention is more fully disclosed.

The invention relates in general to a friction disk of the type shown in Walters et al., Patent No. 2,676,125, dated April 20, 1954, which describes a friction disk formed from a spiral wound impregnated woven fabric tape which is bonded under heat and pressure to produce a rigid disk suited for use in automobile clutch facings. The tape is preferably woven somewhat loosely and is impregnated with a bonding agent which is hardenable under heat and pressure to produce the rigid structure required for the above purpose. The tape is disclosed in the Walters et al. patent woven from spun asbestos yarn containing a limited proportion of cotton fibers to improve its spinnability.

Facings of this type are riveted or bonded to a metal clutch plate for automotive or similar uses.

One limiting factor in such clutch assemblies is the tendency of the facing to burst or rupture due to centrifugal force at the high speeds sometimes encountered, such as 8,000 R. P. M. or higher. The rivet holes tend to weaken the facing disc and lower the resistance to centrifugal force whereas bonded but non-riveted discs are undependable under extreme conditions.

A more specific object of this invention is to provide a clutch facing having the mechanical strength required for such high speed operations.

In accordance with this invention the clutch facing is reinforced by a metal disc which is embedded in the disc and bonded thereto. The facing is formed by applying an impregnated, spiral wound facing of the above type on each side of a metal disc having suitably placed holes or perforations therein. The impregnant or bonding agent is cured while the discs are held under high pressure which causes the two impregnated discs to contact through the perforations in the metal disc and to become firmly bonded together as a unit wherein the metal disc serves to reinforce the molded fabric discs.

The unit thus formed may be attached to a clutch plate in the usual manner and is capable of withstanding the centrifugal force due to speeds of 8,000 to 15,000 R. P. M.

The invention will be better understood from the following description, taken in connection with the accompanying drawing in which a specific embodiment has been shown for purposes of illustration.

In the drawing:

Fig. 1 is a detail view of a woven fabric tape from which the facing discs are made;

Fig. 2 is a partial elevation of a wound disc;

Fig. 3 is an elevation of the metal reinforcing disc;

Fig. 4 is a section showing the impregnated wound discs in place on opposite sides of the reinforcing disc before pressing and curing; and Fig. 5 is a similar section through the bonded unit after curing under heat and pressure.

Referring first to Fig. 1 the tape is shown as made from a plied yarn 10 having one or more plies 11 of yarn spun from a blend of asbestos fibers, cotton and synthetic fibers, plied with a continuous filament yarn 12 having high tensile strength and having the other characteristics required for making friction facings, and having one or more plies 13 of a metal wire such as copper.

This yarn 10 is loosely woven into the form of a continuous web 14 which is then impregnated with a suitable bonding and friction compound as set forth in the above mentioned Walters et al. patent. The web 14 may be non-woven if desired, in which case it may be formed by a series of impregnated yarns bonded together by the bonding and friction compound.

The spun yarn 10 may be made from a blend of, for example, 70% asbestos fibers, 22½% cotton fibers and 7½% rayon fibers, and the continuous filament ply 12 may comprise nylon, Dacron, or Orlon, or the like, which has a high tensile strength and light weight.

The bonding and friction compound may consist of a resin or resinous material and may contain a suitable sizing and filler such as synthetic fibers and may contain metal powder which is thoroughly dispersed therein.

The impregnated tape 14 is spirally wound to form a disc 20 of the size required for the clutch facing, or the unimpregnated tape may be spirally wound and the disc 20 impregnated with the above compound.

The reinforcing disc 21 is shown in Fig. 3 as having a plurality of holes 22 or perforations disposed around the entire area thereof.

A wound facing disc 20 and a similar wound backing disc 24 are disposed on opposite sides of the reinforcing disc 21 as shown in Fig. 4. The backing disc 24 may be made considerably thinner than the facing disc 20 as it is not subject to wear during use.

The assembly is then cured under high heat and pressure as specified in said Walters et al. patent and to form a hard, compact unit as shown in Fig. 5. During the curing step the impregnant in the discs 20 and 24 bonds through the holes 22 in the disc 21 to make a select unit wherein the metal reinforcing disc is embedded in and bonded to the wound discs 20 and 24.

The unit is suited to be attached to a clutch plate in the usual manner to provide a mechanically strong friction facing which will withstand high centrifugal forces.

What is claimed is:

A facing to be attached to a clutch plate comprising a perforated metal reinforcing disc having on one side thereof a friction facing disc comprised of compressed spirally wound fabric tape made from plied yarn having one ply composed of spun asbestos and cellulosic fiber and another ply composed of metal wire, impregnated with a heat hardenable bonding resin, said reinforcing disc having on the other side thereof a backing disc which is comprised of the same material as said facing disc, said material of the tape and said bonding resin extending through said perforations in said reinforcing disc to bond said discs together into a unitary structure, said facing disc and said backing disc being coextensive with said reinforcing disc.

References Cited in the file of this patent

UNITED STATES PATENTS

| | | |
|---|---|---|
| 2,054,210 | Weisenburg | Sept. 15, 1936 |
| 2,240,358 | Walters | Apr. 29, 1941 |
| 2,519,865 | Wellman | Aug. 22, 1950 |
| 2,555,260 | Walters | May 29, 1951 |